Jan. 30, 1951 L. W. PARKER 2,539,465
TELEVISION PULSE AND SOUND SEPARATOR
Filed Dec. 1, 1947
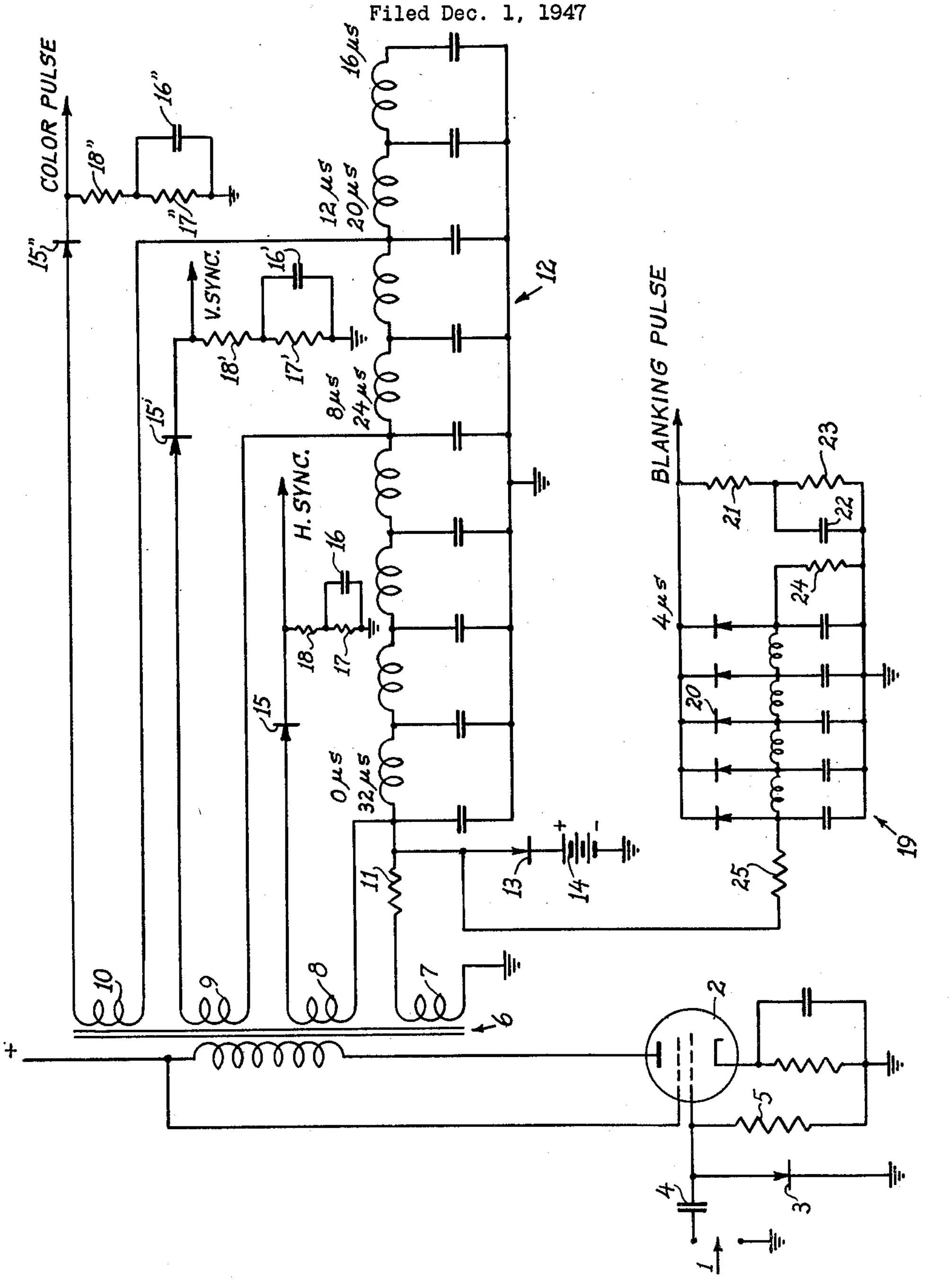
INVENTOR.
LOUIS W. PARKER
BY Robert Harding Jr
ATTORNEY Patented Jan. 30, 1951 2,539,465

UNITED STATES PATENT OFFICE 2,539,465

TELEVISION PULSE AND SOUND SEPARATOR

Louis W. Parker, Little Neck, N. Y., assignor to International Standard Electric Corporation, New York, N. Y., a corporation of Delaware Application December 1, 1947, Serial No. 789,057

15 Claims. (Cl. 178—69.5)

The present invention relates to a method of separating the various synchronizing pulses of a composite video signal, such as the line and frame synchronizing and color pulses, from one another and from the accompanying intelligence signals such as picture and sound signals, and to a circuit arrangement for carrying out this method.

It is customary in television systems to transmit the various synchronizing signals in the form of substantially rectangular pulses having amplitudes greater than the maximum amplitudes of the picture signals and differing from one another either in width or in amplitude, so as to be separable at the receiver by means of threshold devices or pulse width discriminators. The use of such devices makes it necessary to insure a virtually distortionless transmission of the synchronizing pulses so that they may be readily separated without giving rise to false operation.

A principal object of the present invention is to provide a method of differentiating between different types of synchronizing pulses where the pulses may be indistinguishable from one another with respect to their width and/or amplitude.

Another object of the invention is to provide a method of differentiating between pulses occurring at different but known intervals from one another.

A further object of this invention is to provide a method of selecting from a set of pulses occurring at different or random intervals only those pulses that occur with a predetermined cadence, or frequency of occurrence, and of separately selecting further pulses bearing a predetermined relationship with the pulses thus obtained.

Still another object of the invention is to provide a novel arrangement at a television receiver for discriminating between synchronizing pulses of different types.

Yet a further object of this invention is to provide at a television receiver, in combination with an arrangement for separating the synchronizing pulses from the intelligence signals, means for deriving from a synchronizing pulse a blanking pulse occupying a predetermined time interval after the synchronizing pulse from which it has been derived.

A feature of the arrangement for discriminating between synchronizing pulses in accordance with the present invention is the small amount of operating power required, a preferred form of it comprising only a single vacuum tube in combination with a number of linear and non-linear impedance elements including a plurality of small rectifiers which may be of the crystal, copper oxide or selenium type.

The foregoing and other objects and features will become apparent in the course of the following description, taken in conjunction with the accompanying drawing the single figure of which shows a discriminator circuit according to the invention.

The circuit of the invention comprises a discriminator for selecting from an incoming wave pulses of a certain minimum amplitude, a delay network to which the pulses are applied, said network having a time delay corresponding to the intervals of the synchronizing pulses, means for combining the input and output of the delay network whereby the amplitude of pulses occurring at the said intervals will be increased, and means for selecting the pulses of increased amplitude from any other pulses applied to the network.

The composite signal wave composed of synchronizing pulses mixed with intelligence signals is applied at 1 to a pair of input terminals one of which is grounded. In order to make the following description more readily understandable, it will be necessary to describe in some detail the make-up of the composite wave received at 1. In the present instance it has been assumed that the receiver, of which the discriminator circuit illustrated forms a part, is designed for the reproduction of color images at the rate of forty frames a second, each frame consisting of three color fields. Thus a vertical synchronizing impulse will occur 120 times per second. The cadence of the horizontal synchronizing pulse train is assumed to be 31,250 pulses per second, that is to say horizontal synchronizing pulses will occur at intervals of 32 microseconds. The horizontal scanning of successive color fields will be interlaced, i. e. the time position of the horizontal relative to the vertical synchronizing pulses will be displaced by half a horizontal interval, or 16 microseconds, during alternate fields. Accordingly, if the vertical synchronizing pulse is arranged to occur, upon completion of the scanning of an odd-numbered field, at 8 microseconds after the next preceding horizontal synchronizing pulse, it will be seen that at the end of an even-numbered field the spacing between a horizontal and a vertical synchronizing pulse will be 24 microseconds. Similarly, if a color pulse is timed to occur 12 microseconds after a horizontal synchronizing pulse at the end of the first, third, fifth, etc. frame, that is at the end of the third, ninth, fifteenth, etc. field, the same type of pulse will occur 28 microseconds after the horizontal pulse at the end of the second, fourth, sixth, etc. frame which is after the sixth, twelvth, eighteenth, etc. field.

It will of course be appreciated that, if it were at all possible to adhere strictly to the above time schedules, the need for transmitting the various synchronizing signals would not arise since it would then be feasible to synchronize the receiver with impulses from local sources. The present invention, however, simply assumes that the actual signals will deviate but slightly from their predetermined timing, the amount of deviation being of the order of, say, one microsecond. It is also assumed that all synchronizing pulses have substantially the same amplitude (which is greater than the amplitude of all intelligence signals) and a constant width, for example one microsecond, but their precise shape is not critical.

The signal appearing at 1 is applied to the input of a vacuum tube 2 by way of a biasing circuit comprising a rectifier 3, a condenser 4 and a resistor 5. The rectifier 3 serves to build up a negative voltage on the right-hand plate of condenser 4 as the result of pulses applied to the left-hand plate thereof, the value of the resistance 5 being selected so that the voltage on condenser 4 will remain sufficiently negative to insure that only the positive peaks of the pulses bring about the flow of plate current in tube 2.

Connected between a source of anode potential and the tube 2, which has been shown as a tetrode, is the primary of a transformer 6 having four secondaries designated 7, 8, 9 and 10, respectively. The secondary 7 has one terminal grounded and has the other terminal connected to a series resistor 11; connected across the series combination of secondary 7 and resistor 11 is a delay network 12 shunted by a rectifier 13 which is in series with a source of fixed potential shown as a battery 14. The network 12 is composed of eight sections each designed to give a delay of 2 microseconds. The resistance 11 is designed to provide a substantially reflection-free termination for the network 12 at the input end thereof; the value of this resistance in combination with the effective series resistance of the winding 7 is assumed to be small relative to the resistance to reverse current of rectifier 13; thus the voltage normally existing across the input terminals of the network 12 will be substantially zero.

The pulses appearing across the secondaries 7, 8, 9 and 10 will be of such polarity that the upper terminals of these windings will be positive with respect to the associated lower terminals. Thus a positive voltage will appear across the network 12 whenever a pulse is passed by the tube 2 and applied to the transformer 6. The voltage of battery 14 is selected to be appreciably greater than the amplitudes of these pulses so that rectifier 13 does not constitute a short circuit.

When a pulse is applied to the input of network 12 it travels to the end thereof in 16 microseconds, is reflected and returns after a total interval of 32 microseconds to the input end of the network where it is substantially absorbed by the resistance 11. If, at the time when the reflected pulse arrives at the resistance 11, a second pulse appears across the secondary 7, the amplitude of this latter pulse will be augmented by the amplitude of the reflected pulse and the voltage at the common terminal of resistor 11 and rectifier 13 will rise to almost double the amplitude of the original pulse. The lower end of secondary 8 is connected to this common terminal. The voltage of battery 14 is selected so as to place a definite limit upon the magnitude of the potential that may thus be applied to the secondary 8 of transformer 6.

The upper end of the secondary 8 is connected over a rectifier 15 to a time constant circuit which comprises a condenser 16 having associated therewith a shunt resistor 17 and a series resistor 18. The amplitude of any randomly arriving pulse when measured across the resistances 17, 18 will be the sum of the voltages existing across the network 12 and across the secondary 8. This amplitude will reach a maximum whenever the incoming pulse coincides with the arrival of a pulse reflected from the end of network 12. Since it is assumed that horizontal synchronizing pulses will reach the transformer 6 at 32 microsecond intervals, which is precisely the time required by a pulse for traveling to the end of the network and back, there will appear across the network 16, 17, 18 a pulse of maximum amplitude every time a horizontal synchronizing pulse appears at the input 1 (with the obvious exception of the first pulse of a series). These pulses of maximum amplitude build up a bias potential on condenser 16 which, by virtue of a long time constant of elements 16, 17 somewhat in excess of 32 microseconds, will prevent any random pulses of appreciably less than the said maximum amplitude from passing through the rectifier 15. The selected synchronizing pulses pass through the resistor 18 and develop a voltage drop thereacross which may be utilized, by means of a suitable lead connected to the upper terminal of that resistor. to control the operation of the blocking oscillator (not shown) of the horizontal sweep generator associated with the receiver's cathode ray tube.

The effect of the delay network 12 will be to place the synchronizing pulse upon a pedestal, thereby raising its amplitude sufficiently to let the peak of the pulse pass through the rectifier 15 and the associated circuit. Since the peak portion of the pulse will be that part which appeared across the secondary 8, it will be of little importance if the pedestal, or the voltage appearing across the network 12, is somewhat distorted because of a widening of the original pulse during its passage through the network. Even a doubling of the original width of this pulse of 1 microsecond will not be critical.

It has been stated before that the vertical synchronizing pulse will occur alternately 8 and 24 microseconds after a horizontal synchronizing pulse. A connection between the lower end of secondary 9 and the mid-point of network 12 will pick up a pulse both 8 and 24 seconds after the occurrence of a horizontal synchronizing pulse. If another pulse, which will be a vertical synchronizing pulse, is impressed across secondary 9 at the same time, there will then appear a pulse of maximum amplitude across the network 16′, 17′, 18′ connected in series with rectifier 15′. The elements 15′, 16′, 17′ and 18′ have the same functions as their unprimed counterparts except that the time constant of the circuit 16′, 17′ has been adapted to the considerably lower rate of occurrence of the vertical synchronizing pulses which is 120 pulses per second. The vertical synchronizing pulses may be utilized by means of a suitable lead connected to the upper terminal of resistor 18′.

In entirely analogous manner the color pulses may be obtained from the secondary 10 of transformer 6 by means of a rectifier 15'' in series with a network consisting of a resistor 18'' in series with the parallel combination of a resistor 17'' and a condenser 16''. The lower end of winding 10 is connected to the 12 microsecond delay point on network 12 which is also the 20 microsecond delay point, the latter fact being however of no significance. In accordance with the assumptions made before there will appear a pulse of maximum amplitude across the network 16'', 17'', 18'' in the third, ninth, fifteenth, etc. field or in any other frame while the pulses transmitted in the remaining frames, occurring 28 microseconds after the horizontal synchronizing pulse, will be lost; twenty color pulses per second however have been found to give an entirely satisfactory performance. The color pulses are picked up by means of a lead connected to the upper terminal of resistor 18''.

When the intelligence signals are to include sound as well as picture components then it is customary to place the sound signals at a definite time interval after the horizontal synchronizing pulse during the horizontal blanking period. The sound signals may comprise frequency modulated waves or time modulated pulses. In accordance with a further feature of the invention a blanking pulse, usable to cut off the beam of the kinescope and to unblock the sound demodulating equipment of the receiver, may be derived from the horizontal synchronizing pulse. The blanking pulse may have any desired width which in the present example has been fixed at four microseconds. The blanking pulse generator shown in the drawing comprises a delay network 19 having four sections each designed to give a delay of 1 microsecond. At each 1 microsecond delay point there is provided a rectifier 20 connected in series with a common output circuit which comprises a resistor 21 in series with the parallel combination of a condenser 22 and a resistor 23. A further resistor 24 serves to terminate the network 19 in its characteristic impedance, thereby preventing reflections. The input of network 19 is connected to the input of network 12 over a resistance 25 serving, in combination with resistance 11, to provide proper termination for the latter network.

Whenever a pulse is applied to the input of network 19, it will travel to the end of that network in four microseconds and will be absorbed in resistance 24. At the zero, 1, 2, 3 and 4 microsecond delay points, however, a small part of the pulse energy will be taken off through a respective rectifier 20 and will be applied to the output circuit 21, 22, 23 to produce a voltage drop across the resistor 21. Although theoretically composed of five discrete pulse elements, the output of network 19 will actually represent a single pulse lasting four microseconds longer than the horizontal synchronizing pulse, due to the distortion this pulse undergoes while passing through the network.

The output circuit 21, 22, 23 will be recognized as being of similar structure as the circuit 16, 17 and 18 from which the horizontal synchronizing pulse is obtained, and its function is likewise to bias the network against responding to pulses having less than maximum amplitude. Thus the only pulses which will be effective to produce a blanking pulse in the output of networks 19 will be those which occur at the 32 microsecond intervals reserved for the line scanning or horizontal synchronizing pulses. The biasing potential built up on condenser 22 also serves, however, to provide a sharper cutoff at the end of the four microsecond delay period. It may be noted that it is also possible to connect the network 19 directly across the secondary 7, rather than across this winding in series with resistor 11, in which case however there will be no discrimination between the different types of pulses applied to transformer 6 and pulses other than horizontal synchronizing pulses will also be followed by a blanking pulse. This however, need not cause any trouble even if each of these blanking pulses acts to unblock the sound demodulator, since sound modulation will be present only during the interval immediately following the line scanning pulse. With the arrangement shown in the drawing, however, blanking pulses will only be produced by horizontal synchronizing pulses properly identified by means of the network 12.

Although but a single embodiment of the invention has been described and illustrated, it is to be understood that the invention is not limited to the precise arrangement shown and that various modifications and adaptations of the principles herein disclosed will readily occur to those skilled in the art. In particular it will be apparent that absolute and relative values different from those specified hereinabove may be employed without departing from the spirit and scope of the invention as defined in the objects and in the appended claims.

What is claimed is:

1. In a television receiver, a discriminator for selecting synchronizing pulses, including horizontal synchronizing pulses occurring substantially at predetermined intervals and vertical synchronizing pulses occurring at a given point in an interval between said horizontal synchronizing pulses, a single delay network common to all said synchronizing pulses and having a delay time corresponding to said predetermined intervals, means for applying the received horizontal and vertical synchronizing pulses to said common delay network, means for combining the input with the output of said delay network to increase the amplitude of horizontal synchronizing pulses occurring at said predetermined intervals, means coupled to said delay network at an intermediate delay point corresponding to the time position of said given point within said intervals for picking up portions of the delayed pulses, means coupled to said pick up means for combining with increased amplitude the picked up portions of said horizontal synchronizing pulses with subsequent vertical synchronizing pulses received at the time of said pick up, and means for selecting said pulses of increased amplitude from any other pulses applied to the network.

2. In a television receiver, a discriminator for separating different types of synchronizing pulses, including a first type of pulses occurring substantially at predetermined intervals and a second type of pulses each occurring substantially at a given point in an interval between pulses of the first type, comprising means for receiving a composite signal wave, means for selecting from said wave pulses of certain minimum amplitude, a single delay network common to said different types of synchronizing pulses and having a delay time corresponding to said predetermined intervals, means for applying the selected pulses to the delay network, means for combining the input with the output of said delay network whereby the amplitude of pulses of the first type occurring at said predetermined intervals will be increased, means connecting the output of said selecting means to an intermediate point on the delay network, the delay time on said intermediate point corresponding to the time interval between pulses of the first and second type, whereby the amplitude of pulses of the second type occurring at said given point within said intervals will be increased in amplitude by the delayed pulses of the first type, means for selecting from the input of the network the pulses of increased amplitude, and means for selecting from said intermediate point the pulses of increased amplitude.

3. In a television receiver according to claim 2 wherein said means for selecting pulses of increased amplitude each comprises a time constant circuit having a resistor in series with the parallel combination of a resistor and a condenser.

4. In a television receiver according to claim 1 comprising a second delay network having a delay time substantially less than the first delay network, means for applying said pulses of increased amplitude to the input of said second network, means interconnecting a plurality of delay points on said second network, and means for deriving a blanking pulse from said interconnecting means.

5. In a television receiver according to claim 4 wherein said interconnecting means comprises a plurality of rectifiers.

6. In a television receiver according to claim 5 wherein each of said rectifiers is connected in series with a time constant circuit comprising a resistor in series with the parallel combination of a resistor and a condenser.

7. A discriminator for separating horizontal and vertical synchronizing pulses from each other and from the rest of a television signal wave comprising an amplifier tube, means for applying said signal wave to the input of said tube, means for biasing said tube so as to pass current only upon the occurrence of pulses of predetermined amplitude, a transformer having its primary connected in the output circuit of said tube and having a plurality of secondaries, a single delay network common to said horizontal and vertical synchronizing pulses and having a coefficient of reflection of substantially unity, means connecting the first of said secondaries across the input end of said delay network, means for deriving a horizontal synchronizing pulse including another of said secondaries, means connecting one end of said other secondary to an input terminal of the delay network, a rectifier connected to the other end of said other secondary, and means for biasing said rectifier so as to pass only pulses of substantially maximum amplitude corresponding to the combination of a horizontal synchronizing pulse appearing across the first and the second secondary with a delayed horizontal synchronizing pulse reflected simultaneously by the network, and means for deriving a vertical synchronizing pulse including a further one of said secondaries, means connecting one end of said further secondary to an intermediate point on said delay network, a rectifier connected to the other end of said further secondary, and means for biasing said rectifier so as to pass only pulses of substantially maximum amplitude corresponding to the combination of a vertical synchronizing pulse appearing across the said further secondary with a delayed horizontal synchronizing pulse existing simultaneously at said intermediate point.

8. A discriminator according to claim 7 wherein the input end of said network is terminated substantially in its characteristic impedance.

9. A discriminator according to claim 7 wherein said rectifier biasing means each comprises a resistor in series with the parallel combination of a resistor and a condenser.

10. A discriminator according to claim 7 wherein said further secondary is connected to the midpoint of the delay network.

11. A discriminator according to claim 7, further comprising means for deriving a color synchronizing pulse including a fourth secondary of said transformer, means connecting one end of said fourth secondary to an additional intermediate point on said delay network, a rectifier connected to the other end of said fourth secondary, and means for biasing said rectifier so as to pass only pulses of substantially maximum amplitude corresponding to the combination of a color synchronizing pulse appearing across the said fourth secondary with a delay horizontal synchronizing pulse existing simultaneously at said additional intermediate point.

12. A discriminator according to claim 7, further comprising means for limiting the amplitude of a pulse appearing at the input end of the delay network.

13. A discriminator according to claim 7, further comprising a second delay network having a delay time substantially less than that of the first delay network, means terminating said second network substantially in its characteristic impedance, means connecting the input end of said second network across the input of said first network, means interconnecting a plurality of delay points on said second network, and means for deriving a blanking pulse from said interconnecting means.

14. A discriminator according to claim 13 wherein said interconnecting means comprises a plurality of rectifiers each connected between a respective delay point and an output circuit.

15. A discriminator according to claim 14 wherein said output circuit comprises means for biasing said rectifiers so as to pass only pulses of substantially maximum amplitude, said biasing means including a resistor in series with the parallel combination of a resistor and a condenser.

LOUIS W. PARKER.

REFERENCES CITED

The following references are of record in the file of this patent:

UNITED STATES PATENTS

| Number | Name | Date |
|---|---|---|
| 2,252,599 | Lewis | Aug. 12, 1941 |
| 2,309,506 | Herbst | Jan. 26, 1943 |
| 2,416,424 | Wilson | Feb. 25, 1947 |